US008439543B2

(12) United States Patent
Tanaka et al.

(10) Patent No.: US 8,439,543 B2
(45) Date of Patent: May 14, 2013

(54) LIGHT SOURCE UNIT HAVING A MOUNTING RIB AND TWO PLURALITIES OF FINS EACH EXTENDING IN DIFFERENT DIRECTIONS

(75) Inventors: Yoshiharu Tanaka, Kiyosu (JP); Akihiro Misawa, Kiyosu (JP); Hiroki Tsuge, Kiyosu (JP); Kenji Asano, Nagoya (JP)

(73) Assignee: Toyoda Gosei Co., Ltd., Kiyosu-shi, Aichi-ken (JP)

( * ) Notice: Subject to any disclaimer, the term of this patent is extended or adjusted under 35 U.S.C. 154(b) by 252 days.

(21) Appl. No.: 12/926,887

(22) Filed: Dec. 15, 2010

(65) Prior Publication Data

US 2011/0141742 A1 Jun. 16, 2011

(30) Foreign Application Priority Data

Dec. 16, 2009 (JP) ................................ P2009-284617

(51) Int. Cl.
*B60Q 1/00* (2006.01)

(52) U.S. Cl.
USPC ............................ 362/547; 362/373; 362/294

(58) Field of Classification Search .................. 362/294, 362/373, 547; 165/185, 80.1, 80.2, 80.3; 361/697, 710
See application file for complete search history.

(56) References Cited

U.S. PATENT DOCUMENTS

| | | | | |
|---|---|---|---|---|
| 6,210,024 | B1 * | 4/2001 | Shida | 362/345 |
| 7,441,933 | B2 | 10/2008 | Tsukamoto et al. | |
| 7,643,293 | B2 * | 1/2010 | Chu | 361/700 |
| 2007/0109806 | A1 | 5/2007 | Tsukamoto et al. | |
| 2007/0253202 | A1 * | 11/2007 | Wu et al. | 362/294 |

FOREIGN PATENT DOCUMENTS

| | | | |
|---|---|---|---|
| JP | 2007-141549 | A | 6/2007 |
| JP | 4232725 | B2 | 12/2008 |
| JP | 2009-199780 | A | 9/2009 |

* cited by examiner

*Primary Examiner* — Robert May
(74) *Attorney, Agent, or Firm* — McGinn IP Law Group, PLLC

(57) ABSTRACT

A light source unit mounted in a mount portion of a vehicle includes a heat block and a reflector accommodated in an imaginary cylinder that is defined by a holding device for holding an outer circumference of a lens. A first heat dissipating portion and a second heat dissipating portion, which are partitioned by a partition plate, are provided on an outer circumferential surface of the heat block. A plurality of fins are projected on the first heat dissipating portion which is disposed on a lens side of the heat block so as to extend in a circumferential direction, and a second plurality of fins are projected on the second heat dissipating portion so as to extend in an axial direction of the heat block. The partition plate includes a mounting rib, and a mounting device is provided on the mounting rib for mounting the light source unit in the mount portion of the vehicle.

4 Claims, 8 Drawing Sheets

LIGHT SOURCE UNIT HAVING A MOUNTING RIB AND TWO PLURALITIES OF FINS EACH EXTENDING IN DIFFERENT DIRECTIONS

BACKGROUND OF THE INVENTION

1. Field of the Invention

The present invention relates to a light source unit.

2. Related Art

Conventionally, light source units having LED lamps have been used as light sources for vehicle lamps such as headlamps. As examples of those light source units, there are raised light source units which are disclosed in JP-A-2007-141549, Japanese Patent No. 4232725 and JP-A-2009-199780. In a configuration disclosed in JP-A-2007-141549, a light source unit is detachably mounted on a bracket which doubles as a heatsink via a feeding socket.

In configurations disclosed in Japanese Patent No. 4232725 and JP-A-2009-199780, heat dissipating fins are provided at a lower portion of the light source unit.

In the configuration disclosed in JP-A-2007-141549, the bracket includes a plurality of mount portions and also includes a plurality of heat dissipating fins on an opposite side to the side where the mount portions are provided. This enlarges the bracket in size and makes complex an optical system as well as the configuration of the lamp system. In the configurations disclosed in Japanese Patent No. 4232725 and JP-A-2009-199780, although the configuration of the lamp system is made simple since the heat dissipating fins are provided on the light source unit itself, the configurations do not take into consideration the facilitation of mounting and dismounting of the light source unit.

On the other hand, with the increasing tendency to use LED lamps with higher luminance, a higher heat dissipating performance has been desired for light source units having LED lamps. In this respect, in any of the configurations disclosed in JP-A-2007-141549, Japanese Patent No. 4232725 and JP-A-2009-199780, there still exists room for improvement in heat dissipating performance.

SUMMARY OF THE INVENTION

An object of the invention is to provide a light source unit which has a superior heat dissipating performance, which is small in size and which takes into consideration the facilitation of mounting and dismounting thereof.

To solve the problem, the inventor and others involved in the invention have made deep studies to reach the invention. Aspects of the invention are described as follows.

Namely, according to a first aspect of the invention, there is provided a light source unit in which a heat block and a reflector are accommodated in an imaginary cylinder which would be defined by a holding device for holding an outer circumference of a lens and which is mounted in a mount portion on a vehicle, wherein a first heat dissipating portion and a second heat dissipating portion, which are partitioned by a partition plate, are provided on an outer circumferential surface of the heat block, wherein a plurality of fins are projected on the first heat dissipating portion which is disposed on a lens side of the heat block so as to extend in a circumferential direction, and a plurality of fins are projected on the second heat dissipating portion so as to extend in an axial direction of the heat block, and wherein the partition plate has a mounting rib, and a mounting device is provided on the mounting rib for mounting the light source unit in the mount portion of the vehicle.

In the light source unit according to the first aspect of the invention, the fins are projected on the first heat dissipating portion which lies on the lens side of the heat block so as to extend in the circumferential direction, and the fins are projected on the second heat dissipating portion so as to extend in the axial direction of the heat block. By this configuration, air around the lens side of the heat block flows in a circumferential direction of the heat block along the fins of the first heat dissipating portion, and air around the opposite side of the heat block (that is, a rear portion side of the light source unit) flows in the axial direction of the heat block along the fins. As a result, air around the heat block flows along an outer edge of the heat block efficiently. Therefore, compared with such an event that the fins of the first heat dissipating portion and the fins of the second heat dissipating portion are projected so as to extend in the same direction, air flows better around the heat block, a good heat dissipating effect being thereby provided.

A configuration can be considered in which the fins of the first heat dissipating portion and the fins of the second heat dissipating portion are projected the other way round in terms of directions in which the fins extend (that is, the fins of the first heat dissipating portion are projected so as to extend in the axial direction, while the fins of the second heat dissipating portion are projected so as to extend in the circumferential direction). In this configuration, the fins projected so as to extend in the axial direction on the first heat dissipating portion are closed at their front ends by the holding device and are closed at their rear ends by the partition plate. Therefore, air is caused to stay between the fins, decreasing the heat dissipating effect remarkably.

In contrast to this, in the configuration according to the first aspect of the invention, although the fins projected so as to extend in the axial direction on the second heat dissipating portion are closed at their front ends by the partition plate but are kept open at their rear ends. Therefore, air flows towards the respective rear ends of the fins in a smooth fashion, there being no fear that the heat dissipating effect is disturbed.

In addition to this, since the heat block and reflector are accommodated in the imaginary cylinder which would be defined by the holding device for holding the outer circumference of the lens, the light source unit can be made small in size. Additionally, the configuration takes into consideration the facilitation of mounting and dismounting of the light source unit on and from the mount portion of the vehicle by use of the mounting rib provided on the partition plate which constitutes a partition between the first heat dissipating portion and the second heat dissipating portion.

According to a second aspect of the invention, there is provided a light source unit as set forth in the first aspect, wherein the mounting device is an engagement hole formed in the mounting rib, and the mounting rib is mounted on the mount portion of the vehicle by an engagement device which is in engagement with the engagement hole.

According to the light source unit of the second aspect of the invention, the mounting and dismounting of the light source unit on and from the mount portion of the vehicle can be facilitated further with the simple configuration. As a result, labor hours required for replacement or repair of the light source unit can be decreased.

According to a third aspect of the invention, there is provided a light source unit as set forth in the first or second aspect of the invention, wherein the partition plate is formed substantially at a center of the heat block, and the mounting rib projects from the heat block in a radial direction thereof.

According to the light source unit of the third aspect of the invention, the first heat dissipating portion and the second heat dissipating portion are partitioned by the partition plate substantially at the center of the heat block. Therefore, the areas of the first and second heat dissipating portions are secured sufficiently, whereby heat can be dissipated with good balance. Thus, the heat dissipating performance is increased further as a whole. Further, since the mounting rib projects from the heat block in the radial direction thereof, the mounting and dismounting of the light source unit on and from the mount portion of the vehicle can be facilitated further.

A configuration can be considered in which the partition plate is omitted and as with the fins of the second heat dissipating portion, fins are projected on the first heat dissipating portion so as to extend in the axial direction of the heat block so that the fins of the first heat dissipating portion and the fins of the second heat dissipating portion are integrally connected to each other. In this configuration, the fins of both the heat dissipating portions extend continuously from a front end to a rear end of the heat block. Therefore, the fins become long, which facilitates the stay of air between the fins, the heat dissipating effect being thereby decreased remarkably.

In contrast to this, in the configuration according to the third aspect of the invention, the fins of the second heat dissipating portion only extend substantially half the axial length of the heat block, and the length of the fins of the second heat dissipating portion becomes shorter than that of the fins of the aforesaid configuration, whereby it becomes difficult for air to stay between the fins, the heat dissipating effect being thereby enhanced.

According to a fourth aspect of the invention, there is provided a light source unit as set forth in any of the first to third aspects of the invention, wherein a guide rib is formed on the heat block so as to extend in the axial direction thereof and the guide rib is brought into engagement with the mount portion of the vehicle.

According to the light source unit of the fourth aspect of the invention, since the guide rib is brought into engagement with the mount portion of the vehicle, the stability in mounting the light source unit on the mount portion of the vehicle can be enhanced.

DETAILED DESCRIPTION OF THE PREFERRED EMBODIMENTS

Figure 1:
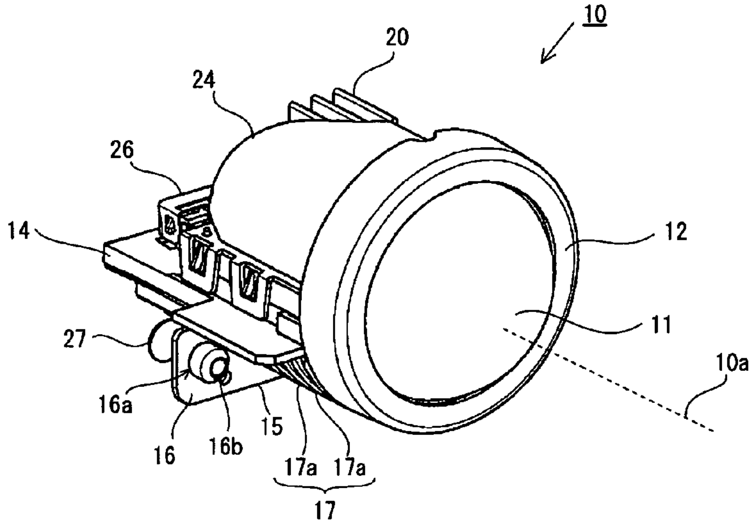
FIG. 1 is a perspective view of a light source unit 10 which is a first embodiment of the invention.

Hereinafter, referring to the drawings, a first embodiment of the invention will be described in detail. FIGS. 1 to 4 and FIGS. 5A and 5B are a perspective view, an exploded perspective view, a left side view, a bottom view, a front view and a rear view of a light source unit 10 of a first embodiment of the invention, respectively.

In the following description, a "front side" denotes a front side of the light source unit, and a "left side" denotes a left side of the light source unit 10 when the light source unit 10 is viewed from the front side thereof.

[Configuration of Light Source Unit 10]

As is shown in FIG. 1, the light source unit 10 is a headlamp for a vehicle and has a projector type unit construction. As is shown in FIG. 2, the light source unit 10 includes a lens 11 (a flange **11*a*, a notch 11*b*, through holes 11*c*), a lens holder 12 (a holding device, a circumferential wall portion 12*a*, a lens fastening portion 12*b*, engagement claws 12*c*), a shade 13 (a lens mount portion 13*a*, a cut line forming portion 13*b*, projections 13*c*, 13*d*, a flange 13*e*, a fixing portion 13*f*, a through hole 13*g*, a male screw 13*h*, a cut line 13*i*, engagement projections 13*j*, 13*k*), a heat block 14 (a sloping portion 14*a*, a flat portion 14*b*), a partition plate 15, a mounting rib 16, an engagement hole (a mounting device) 16*a*, a registration hole 16*b*, a first heat dissipating portion 17 (fins 17*a*, a cut portion 17*b*, an internal thread 17*c*), a second heat dissipating portion 18 (fins 18*a*, a cut portion 18*b*), guide ribs 19, a third heat dissipating portion 20 (fins 20*a*), a pedestal 21, mount members 22 (engagement projections 22*a*, through holes 22*b*), mount members 23 (through holes 23*a*), a reflector 24 (a reflecting surface 24*a*, engagement frames 24*b*, 24*c*), a light source 25 (a light source chip 25*a*, a housing 25*b*, a connector 25*c*), a fixing member 26 (plate materials 26*a*, a connecting material 26*b*, engagement frames 26*c*), a clip 27 (engagement device: a head portion 27*a*, a collar portion 27*b*, a leg portion 27*c***) and the like.

Figure 2:
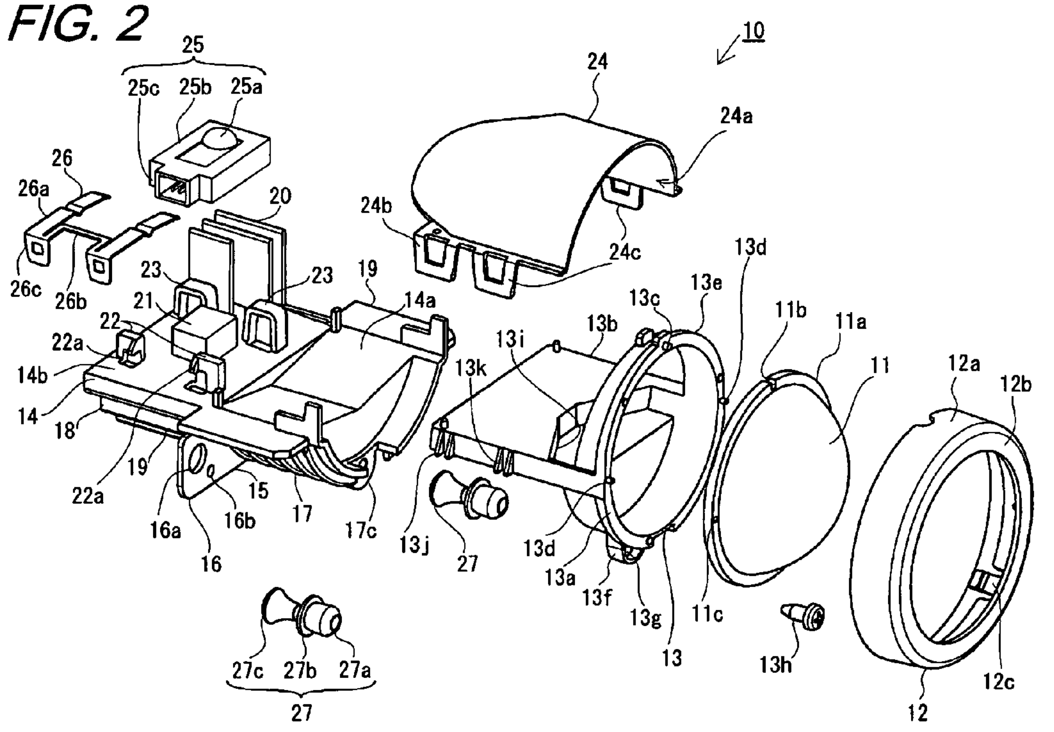
FIG. 2 is an exploded perspective view of the light source unit 10.

As is shown in FIG. 2, the projection lens 11 is an aspheric convex lens. A thin circular ring-shaped flange **11*a* is formed along an outer circumferential edge portion of the lens 11, and one notch 11*b* and two through holes 11*c* are formed in the flange 11*a***.

The lens holder 12 is integrally formed of a synthetic resin material having flexibility through injection molding and includes a circumferential wall portion **12*a* and a lens fastening portion 12*b***.

The circumferential wall portion **12*a* has a substantially cylindrical shape. An inside diameter of the circumferential wall portion 12*a* is formed slightly larger than an outside diameter of the lens 11, and a plurality of engagement claws 12*c* are provided on an inner wall surface of the circumferential wall portion 12*a*** so as to project therefrom.

The lens fastening portion **12*b* has a thin circular ring-like shape and is formed at a front side of the circumferential wall portion 12*a***.

The shade 13 is formed integrally of an opaque synthetic resin material that transmits no light through injection molding and includes a lens mount portion **13*a* and a cut line forming portion 13*b***.

The lens mount portion **13*a* has a substantially ring-like shape. An outside diameter of the lens mount portion 13*a* is substantially the same as an outside diameter of the flange 11*a* of the lens 11, and one projection 13*c* and two projections 13*d* are provided on a front side of the lens mount portion 13*a* so as to project therefrom. A thin circular ring-shaped flange 13*e* is formed along an outer circumferential edge portion of the lens mount portion 13*a*. A fixing portion 13*f* is provided at a lower portion of the lens mount portion 13*a* so as to project downwards therefrom, and a through hole 13*g* is formed in the fixing portion 13*f*. A male screw 13*h* is inserted through the through hole 13*g***.

The cut line forming portion 13*b* is formed at a rear side of the lens mount portion 13*a*, and a cut line (a cut-off line) 13*i* is provided which defines a recess portion which is cut into a trapezoidal recess portion. Two engagement projections 13*j*, 13*k* which are configured identically are formed on each of left and right external sides of the cut line forming portion 13*b*. Each of the engagement projections 13*j*, 13*k* is made up of two elongated projections which are disposed parallel.

The heat block 14 is formed integrally of an opaque material that transmits no light and which has superior heat conductivity (for example, injection molding of a synthetic resin material or die casting of an aluminum alloy). The heat block 14 has a substantially semi-cylindrical shape and is disposed so that an axial direction of the semi-cylindrical shape coincides with the direction of an optical axis 10*a* of the light source unit 10. Provided on the heat block 14 are the partition plate 15, the mounting rib 16, the first heat dissipating portion 17, the second heat dissipating portion 18, the guide ribs 19, the third heat dissipating portion 20, the pedestal 21 and the mount members 22, 23.

The partition plate 15 has a substantially rectangular plate-like shape and is formed on a lower side of the heat block 14 at a substantially center thereof in a longitudinal direction (that is, an axial direction of the heat block 14).

The mounting rib 16 is made up of left and right end portions of the partition plate 15 and projects from the substantially semi-cylindrical heat block 14 in a radial direction thereof.

Two engagement holes (mounting device) 16*a* and two registration holes 16*b* are formed in the mounting rib 16 so as to pass therethrough. The engagement holes 16*a* are disposed in proximity to left and right end portions of the mounting rib 16, and the registration holes 16*b* are disposed in positions lying in proximity to the corresponding engagement holes 16*a* and closer to a center of the mounting rib 16. A diameter of each registration hole 16*b* is extremely smaller than each engagement hole 16*a*, and therefore, even in the event that the registration holes are so provided, there is no fear that the strength of the mounting rib 16 is decreased.

Figure 3:
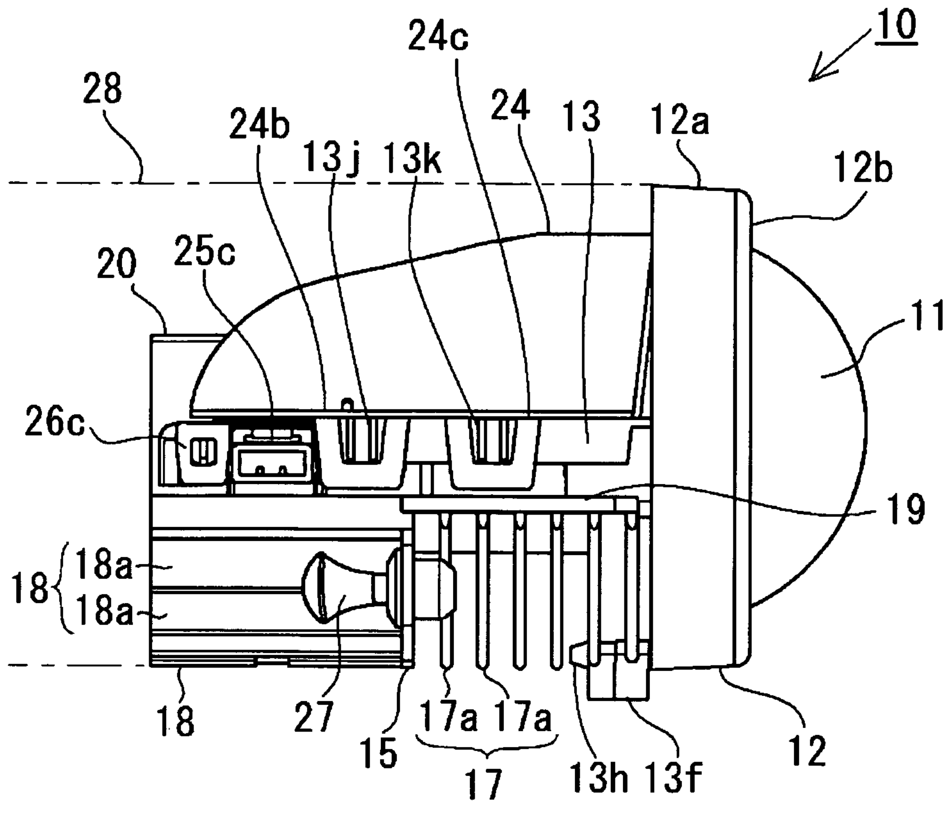
FIG. 3 is a left side view of the light source unit 10.

As is shown in FIG. 3, the first heat dissipating portion 17 and the second heat dissipating portion 18 are formed on a lower circumferential surface of the heat block 14. The first and second heat dissipating portions 17, 18 are partitioned by the partition plate 15.

The first heat dissipating portion 17 is disposed on a lens 11 side of the heat block 14 (a front side of the light source unit 10), and six fins 17*a* are projected on the first heat dissipating portion 17 at equal intervals so as to extend in a circumferential direction of the substantially semi-cylindrical heat block 14 (that is, a circumferential direction of an imaginary cylinder 28 which would be defined by the lens holder 12). Two fins 7*a* which are disposed on the lens 11 side are formed into a flange-like shape, while the remaining fins 17*a* are formed into a semi-circular disk-like shape. Respective distal end portions of the fins 17*a* are positioned on a semi-cylindrical circumferential surface of the heat block 14 as a whole.

Figure 4:
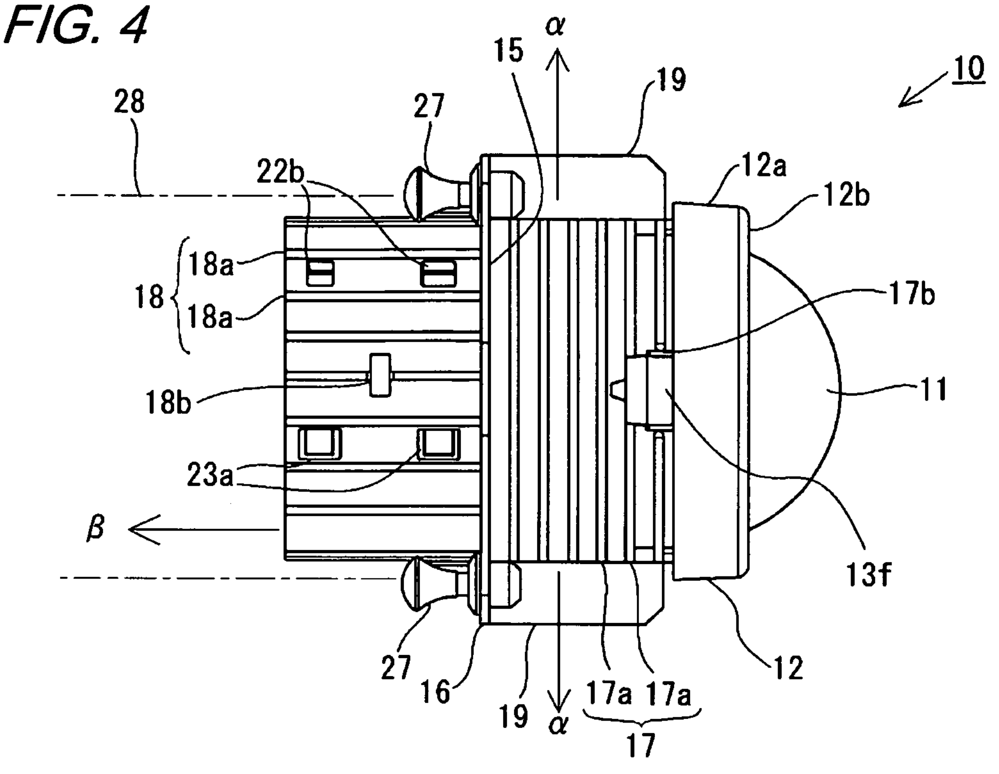
FIG. 4 is a bottom view of the light source unit 10.
Figure 5A:
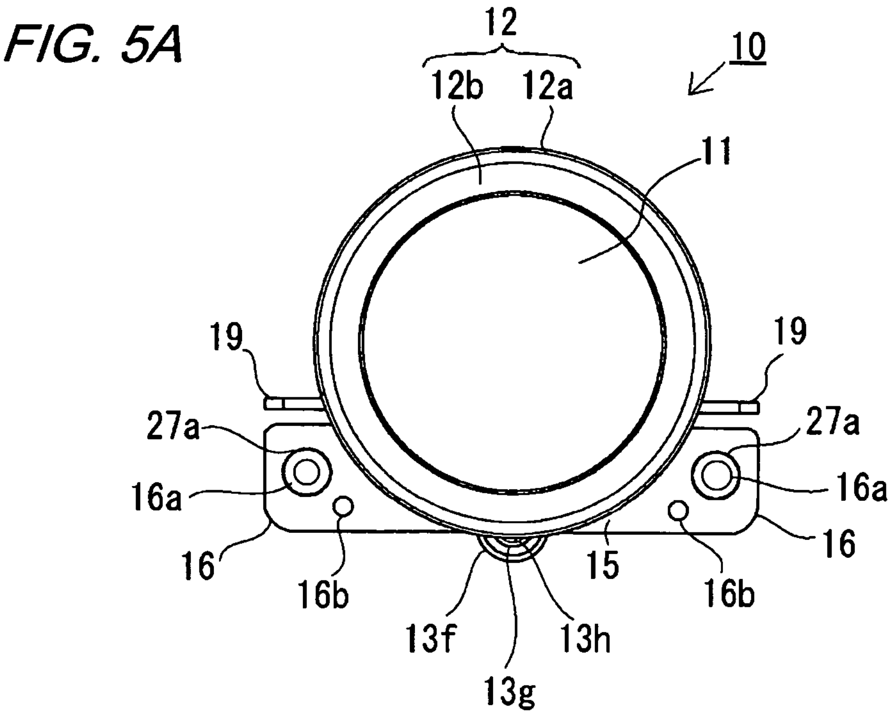
FIG. 5A is a front view of the light source unit 10.
Figure 5B:
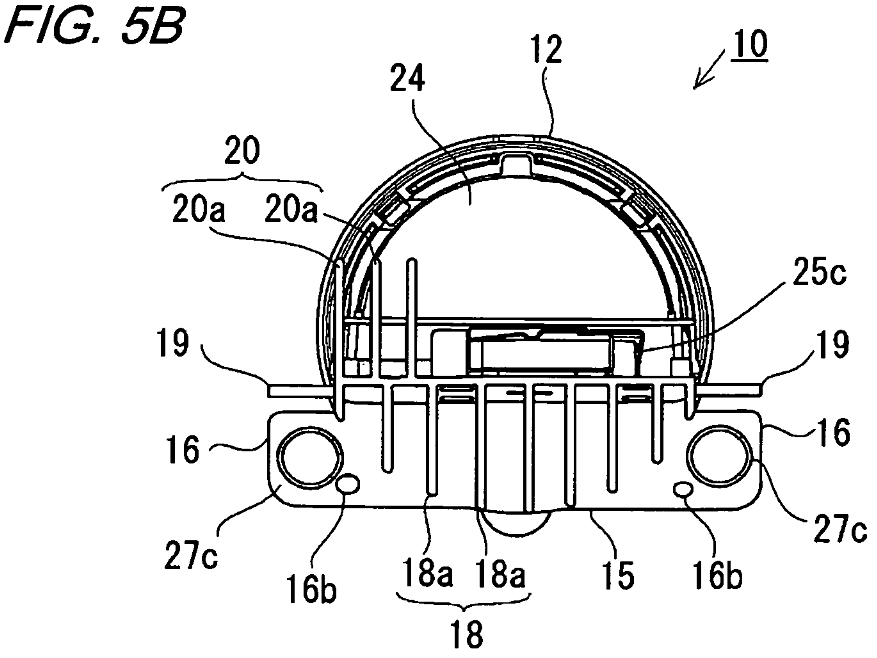
FIG. 5B is a rear view of the light source unit 10.

As is shown in FIG. 4, a cut portion 17*b* is formed in the fin 17*a* which is disposed nearest the lens 11 on the first heat dissipating portion 17 so that the fixing portion 13*f* of the shade 13 is matched thereto. A central portion of the fin 17*a* which lies adjacent to the fin 17*a* in which the cut portion 17*b* is formed is extended further outwards than the other portions and a female thread 17*c* (refer to FIG. 2) is formed in the extended portion.

As is shown in FIG. 4, the second heat dissipating portion 18 is disposed on a rear side of the light source unit 10. Nine fins 18*a* are projected on the second heat dissipating portion 18 at equal intervals so as to extend in an axial direction of the substantially semi-cylindrical heat block (that is, in the direction of the optical axis 10*a* of the light source unit 10), and the fins are kept open at their rear ends. Each fin 18*a* has a rectangular plate-like shape, and a height of each fin 18*a* is increased from left and right sides towards a central portion of the heat block 14, respective distal end portions of the fins 18*a* being positioned on the semi-cylindrical outer circumferential surface of the heat block as a whole.

As is shown in FIG. 2, a sloping portion 14*a* is formed on an upper surface of the heat block 14 which lies above the first heat dissipating portion 17, and this sloping portion 14*a* has two sloping surfaces which slope down towards an axis of the heat block 14, and a flat portion 14*b* is formed above the second heat dissipating portion 18.

The two guide ribs 19 each have a substantially rectangular plate-like shape. The guide ribs 19 are projected on the substantially semi-cylindrical heat block 14 so as to extend in the axial direction of the heat block 14 and project from left and right ends of the sloping portion 14*a* of the heat block 14.

The third heat dissipating portion 20, the pedestal 21 and the mount members 22, 23 are projected on the flat portion 14*b* of the heat block 14.

The third heat dissipating portion 20 is disposed at a right side of a rear end portion of the heat block 14, and three rectangular plate-shaped fins 20*a* are provided on the third heat dissipating portion 20 at equal intervals.

The pedestal 21 is disposed substantially at a center of the flat portion 14*b* and has a substantially rectangular parallelepiped shape with a flat upper surface.

The mount members 22, 23 are disposed so as to surround the pedestal 21 from four sides thereof. Engagement projections 22*a* are provided on two mount members 22 which are disposed on a left-hand side of the heat block 14 so as to project therefrom, and upper surfaces of two mount members 23 which are disposed on a right-hand side of the heat block 14 are formed flat.

As is shown in FIG. 4, a cut portion 18*b* is formed in the fin 18*a* on the second heat dissipating portion 18 which is disposed below the pedestal 21.

In addition, through holes 22*b*, 23*a* are formed in the heat block 14 in positions lying in proximity to the mount members 22, 23.

By forming the cut portion 18*b* and the through holes 22*b*, 23*a*, the occurrence of deformation in shape is prevented in forming the heat block 14 through injection molding or die casting. Namely, with the cut portion 18*b* and the through holes 22*b*, 23*a* formed in advance, even in the event that a large thermal shrinkage occurs in proximity to the portions where the pedestal 21 and the mount members 22, 23 are formed when the material of which the heat block 14 is made is cooled, a distortion in shape due to the thermal shrinkage of the material of the heat block 14 can be avoided by the cut portion 18*b* and the through holes 22*b*, 23*a*, whereby a deformation in the overall shape of the heat block 14 can be prevented.

As is shown in FIG. 2, the reflector 24 is formed integrally of a material having flexibility (for example, injection molding of a synthetic resin material or pressing of a sheet metal). A front side of the reflector 24 is opened into a semi-circular shape so as to match the lens mount portion 13*a* of the shade 13 and a lower side of the reflector 24 is opened so as to match an upper surface of the shade 13, an upper surface of the heat block 14 and a connector 25*c* of the light source 25. The reflector 24 is closed continuously on an upper surface side from a front side to a rear side via a central portion thereof into so as to be formed substantially into a dome configuration which covers an upper surface side of the shade 13 and an upper surface side of the heat block 14.

A reflecting surface 24*a* which reflects light of the light source 25 is provided on a portion on an inner wall surface of the reflector 24 where light of the light source is projected. The reflecting surface 24*a* may be provided by applying a paint to which a fine powder material having a high reflecting performance is added, or plating or depositing a metallic material having a high reflecting performance (such as aluminum or chromium). The reflecting surface 24*a* has a primary focal point, a secondary focal point and an optical axis (any of which is omitted), and the secondary focal point is a focal line on a horizontal section, that is, a curved focal line in which both ends are positioned forwards and a center is positioned rearwards when the reflector 24 is viewed from thereabove (from the top thereof).

Two engagement frames 24*b*, 24*c* of the same shape are provided on each of left- and right-hand sides of a lower end portion of the reflector 24 so as to project downwards.

The light source 25 includes a light source chip 25*a*, a housing 25*b*, a connector 25*c* and the like. The light source chip 25*a* includes a spontaneously luminescent semiconductor light source (for example, LED, organic EL).

The housing 25*b* has a substantially rectangular parallelepiped shape. The light source chip 25*a* is fixedly mounted on an upper surface side of the housing 25*b* with a light emitting surface thereof oriented upwards. The connector 25*c* is fixedly mounted on a left lateral surface side of the housing 25*b*.

The connector 25*c* is connected to the light source chip 25*b* via a wiring material (whose illustration is omitted) provided in an interior of the housing 25*b*, and a feeding cable (whose illustration is omitted) is connected to the connector 25*c* for feeding the light source chip 25*a* from an external power supply.

The fixing member 26 is made up of a synthetic resin plate or a metallic plate which has flexibility and includes two plate materials 26*a* for pressing front and rear sides of an upper portion of the housing 25*b* of the light source 25 and a connecting material 26*b* which connects the plate materials 26*a* together. Engagement frames 26*c* are provided at respective left-hand sides of the plate materials 26*a* so as to project downwards.

The clip 27 is made of a synthetic resin material having flexibility and includes a substantially spherical head portion 27*a*, a circular disk-shaped collar portion 27*b* which is connected to the head portion 27*a* and a substantially conical leg portion 27*c* which is connected to the collar portion 27*b* and which widens towards a free end portion thereof.

[Assembled State of Light Source Unit 10 (Refer to FIG. 2)]

A rear side of the shade 13 is mounted on a front side of the heat block 14, and the fixing portion 13*f* of the shade 13 is matched to the cut portion 17*b* of the first heat dissipating portion 17 on the heat block 14. With the female thread 17*c* in the fin 17*a* of the first heat dissipating portion 17 made to communicate with the through hole 13*g* in the fixing portion 13*f*, the male screw 13*h* is inserted to be screwed into the female thread 17*c* from a front side of the through hole 13*g*, whereby the shaft is fixedly mounted on the heat block 14. The positioning of the shade 13 is implemented by a positioning rib (not shown) which his projected on the heat block 14.

The light source 25 is rested on the pedestal 21 on the heat block 14. The fixing member 26 is placed on the light source 25 from thereabove. The plate materials 26*a* of the fixing portion 26 are made to extend between the mount members 22, 23. With the front and rear sides of the upper portion of the housing 25*b* of the light source 25 pressed by the plate materials 26*a*, the engagement frames 26*c* of the plate material 26*a* are brought into engagement with the engagement projections 22*a* of the mount members 22 on the heat block 14, whereby the light source 25 is fixedly mounted on the heat block 14.

The reflector 24 is place on the shade 13 from thereabove, and the engagement frames 24*b*, 24*c* of the reflector 24 are brought into engagement with the corresponding engagement projections 13*j*, 13*k*, whereby the reflector 24 is fixedly mounted on the shade 13. The connector 25*c* of the light source 25 is exposed from a left-hand side of a rear end portion of the reflector 24.

A rear side of the lens 11 is mounted on a front side of the lens mount portion 13*a* of the shade 13. The notch 11*b* in the flange 11*a* of the lens 11 is brought into engagement with the projection 13*c* of the lens mount portion 13*a* and the projections 13*d* on the lens mount portion 13*a* are brought into engagement with the corresponding through holes 11*c* in the flange 11*a*, whereby the lens 11 is temporarily fixed to the shade 13 in such a state that the lens 11 is positioned properly relative to the shade 13.

The circumferential wall portion 12*a* of the lens holder 12 is placed on the shade 13 and the reflector 24, and the lens holder 12 is mounted on a front side of the lens 11. With the inner wall surface of the lens fastening portion 12*b* brought into abutment with the flange 11*a* of the lens 11 so as to hold an outer circumference of the lens 11, the engagement claws 12*c* of the lens holder 12 are brought into engagement with the flange 13*e* of the shade 13, whereby the lens holder 12 is fixedly mounted on the shade 13.

The respective head portions 27*a* of the clips 27 are inserted through the engagement holes 16*a* in the mounting rib 16 on the heat block 14 from a rear side thereof, and with the respective collar portions 27*b* of the clips 27 brought into abutment with a rear side of the mounting rib 16, the head portions 27*a* are brought into engagement with the corresponding engagement holes 16*a*, whereby the clips 27 are fixedly mounted on the mounting rib 16.

[Mounting Configuration of Light Source Unit 10]

The light source unit 10 that is now built up in the way described above is mounted in the mount portion 30 on the vehicle with the heat block 14 and the reflector 24 accommodated within the imaginary cylinder 28 which would be defined by the lens holder (the holding device) 12 which holds the outer circumference of the lens 11. The mount portion 30 of the vehicle is formed integrally of a synthetic resin material through injection molding and is fixedly mounted at a front part (not shown) of the vehicle.

Figure 6:
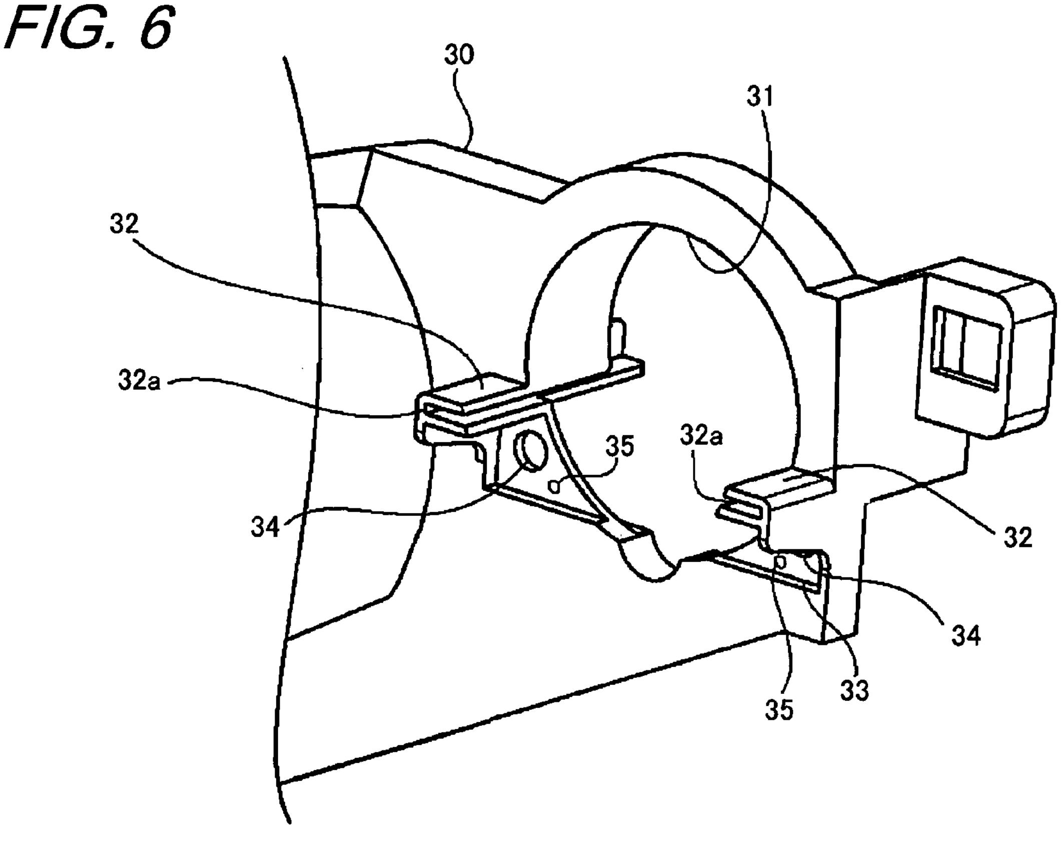
FIG. 6 is a perspective view of a mount portion 30 of a vehicle.

As is shown in FIG. 6, the mount portion 30 on the vehicle includes a mount hole 31, guide members 32, a recess portion 33, through holes 34 and registration projections 35. The mount hole 31 and the through holes 34 are formed in the mount portion 30 on the vehicle so as to pass therethrough.

The mount hole 31 has a substantially circular shape, and a diameter of an opening portion in the mount hole 31 is formed larger than an outside diameter of the lens holder 12.

The two guide members 32 are projected in a vertical direction with respect to the opening portion at left- and right-hand sides of the mount hole 31. A guide groove 32*a* is provided open in each of the guide member 32.

The recess portion 33 is made up of a substantially rectangular recess which matches the mounting rib 16 of the light source unit 10 and is disposed at part of a circumferential edge portion of the mount hole 31 which lies underneath both the guide members 32.

The two through holes 34 are disposed in proximity to left and right end portions of the recess portion 33. The two registration projections 35 are disposed in proximity to the corresponding through holes 34 and closer to a center of the recess portion 33 and project towards the rear of the mount portion 30 on the vehicle.

Figure 7:
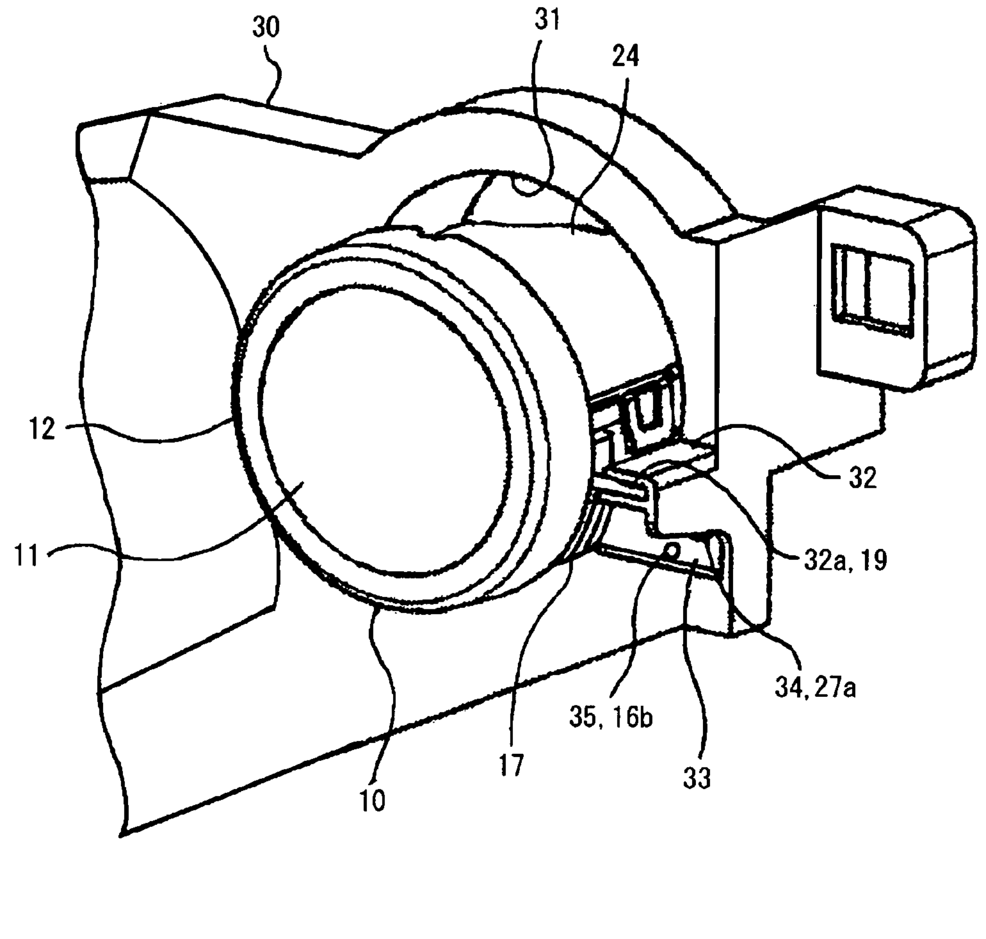
FIG. 7 is a perspective view showing a state in which the light source unit 10 is mounted on the mount portion 30 of the vehicle.

As is shown in FIG. 7, the front side (the lens 11 side) of the light source unit 10 is inserted into the mount hole 31 from the rear of the same hole. The guide ribs 19 on the light source unit 10 are inserted into the corresponding guide grooves 32*a* in the guide members 32 for engagement. The head portions 27*a* of the clips 27 are brought into engagement with the corresponding through holes 34 so that the clips 27 are fixedly mounted in the corresponding through holes 34.

As a result, the light source unit 10 is fixedly mounted in the mount portion 30 on the vehicle through engagement of the guide members 32 with the corresponding guide ribs 19 and fixed mounting of the clips 27 in the corresponding through holes 34.

In the light source unit 10 that is mounted in the mount portion 30 on the vehicle in the way described above, when the light source chip 25*a* of the light source 25 is illuminated to emit light, light of the light source chip 25*a* is radiated upwards to be reflected on the reflecting surface 24*a* of the reflector 24. The reflected light converges on the second focal point of the reflecting surface 24*a*. Part of the reflected light converging on the second focal point of the reflecting surface 24*a* is cut (cut off) by the cut line 13*i* of the shade 13.

In the reflected light converging on the second focal point of the reflecting surface 24*a*, the reflected light which is not cut off by the cut line 13*i* of the shade 13 forms a predetermined light distribution pattern which is defined by the cut line 13*i* (for example, a low beam light distribution pattern of the vehicle) and is projected to the front of the vehicle through the lens 11 so as to illuminate the road surface ahead of the vehicle.

Here, in the event that the lens 11 is configured so that a front side of the lens 11 is formed into a convex aspheric surface having a large curvature, whereas a rear side is formed into a convex aspheric surface having a small curvature or a flat aspheric surface (a flat plane), a dimension of the light source unit 10 in a longitudinal direction (the direction of the optical axis of the lens 11) can be made compact.

[Function and Advantage of First Embodiment]

in the light source unit 10 of the first embodiment, on the heat block 14, the fins 17*a* are projected on the first heat dissipating portion 17 which lies on the lens 11 side of the heat block 14 so as to extend in the circumferential direction, and the fins 18*a* are projected on the second heat dissipating portion 18 so as to extend in the axial direction. By this configuration, air around the lens 11 side of the heat block 14 flows in the circumferential direction of the heat block 14 along the fins 17*a* of the first heat dissipating portion 17 (in a direction indicated by an arrow α in FIG. 4). Air around the opposite side of the heat block 14 to the side facing the lens 11 (that is, around the rear portion of the light source unit 10) flows in the axial direction of the heat block 14 along the fins 18*a* of the second heat dissipating portion 18 (in a direction indicated by an arrow β in FIG. 4). As a result of this, air around the heat block 14 flows along an outer edge of the heat block 14 efficiently. Thus, air around the heat block 14 flows better than such an event that the fins 17*a* of the first heat dissipating portion 17 and the fins 18*a* of the second heat dissipating portion 18 are projected so as to extend in the same direction, whereby a superior heat dissipating effect can be provided.

A configuration can be considered in which the fins 17*a* of the first heat dissipating portion 17 and the fins 18*a* of the second heat dissipating portion 18 are projected the other way round in terms of directions in which the fins extend (that is, the fins of the first heat dissipating portion 17 are projected so as to extend in the axial direction, while the fins of the second heat dissipating portion 18 are projected so as to extend in the circumferential direction). In this configuration, the fins projected so as to extend in the axial direction on the first heat dissipating portion 17 are closed at their front ends by the lens holder 12 and are closed at their rear ends by the partition plate 15. Therefore, air is caused to stay between the fins, decreasing the heat dissipating effect remarkably.

In contrast to this, in the configuration according to the first embodiment, although the fins 18*a* projected so as to extend in the axial direction on the second heat dissipating portion 18 are closed at their front ends by the partition plate 15 but are kept open at their rear ends. Therefore, air flows towards the respective rear ends of the fins 18*a* in a smooth fashion, there being no fear that the heat dissipating effect is disturbed.

In addition to this, in the first embodiment, since the heat block 14 and reflector 24 are accommodated in the imaginary cylinder 28 which would be defined by the lens holder 12 which holds the outer circumference of the lens 11, the light source unit 10 can be made small in size. Additionally, the configuration takes into consideration the facilitation of mounting and dismounting of the light source unit 10 on and from the mount portion 30 on the vehicle by use of the mounting rib 16 provided on the partition plate 15 which constitutes a partition between the first heat dissipating portion 17 and the second heat dissipating portion 18, as well as the engagement holes 16*a* formed in the mounting rib 16.

In the light source of the first embodiment, the mounting rib 16 is mounted on the mount portion 30 on the vehicle by the clips (the engagement device) 27 which are in engagement with the engagement holes (the mounting device) 16*a*. Because of this, the mounting and dismounting of the light source unit 10 on and from the mount portion 30 on the vehicle can be facilitated further with the simple configuration. As a result, labor hours required for replacement or repair of the light source unit 10 can be decreased.

In addition, in the light source unit 10 of the first embodiment, the partition plate 15 is formed substantially at the center of the heat block 14, and the mounting rib 16 projects from the heat block 14 in the radial direction thereof. Because of this, the first heat dissipating portion 17 and the second heat dissipating portion 18 are partitioned by the partition plate 15 substantially at the center of the heat block 14. Therefore, the areas of the first and second heat dissipating portions 17, 18 are secured sufficiently, whereby heat can be dissipated with good balance. Thus, the heat dissipating performance is increased further as a whole. Further, since the mounting rib 16 projects from the heat block 14 in the radial direction thereof, the mounting and dismounting of the light source unit 10 on and from the mount portion 30 on the vehicle can be facilitated further.

A configuration can be considered in which the partition plate 15 is omitted and as with the fins 18*a* of the second heat dissipating portion 18, fins are projected on the first heat dissipating portion 17 so as to extend in the axial direction of the heat block 14 so that the fins 17*a* of the first heat dissipating portion 17 and the fins 18*a* of the second heat dissipating portion 18 are integrally connected to each other. In this configuration, the fins of both the heat dissipating portions extend continuously from a front end to a rear end of the heat block 14. Therefore, the fins become long, which facilitates the stay of air between the fins, the heat dissipating effect being thereby decreased remarkably.

In contrast to this, in the configuration according to the first embodiment, the fins 18*a* of the second heat dissipating portion 18 only extend substantially half the axial length of the heat block 14, and the length of the fins 18*a* of the second heat dissipating portion 18 becomes shorter than that of the fins of the aforesaid configuration, whereby it becomes difficult for air to stay between the fins 18*a*, the heat dissipating effect being thereby enhanced.

In the light source unit 10 according to the first embodiment, the guide ribs 19 are formed on the heat block 14 so as to extend in the axial direction thereof and the guide ribs 19 are brought into engagement with the mount portion 30 of the vehicle. Therefore, the stability in mounting the light source unit 10 on the mount portion 30 on the vehicle can be enhanced.

Other Embodiments

Figure 8:
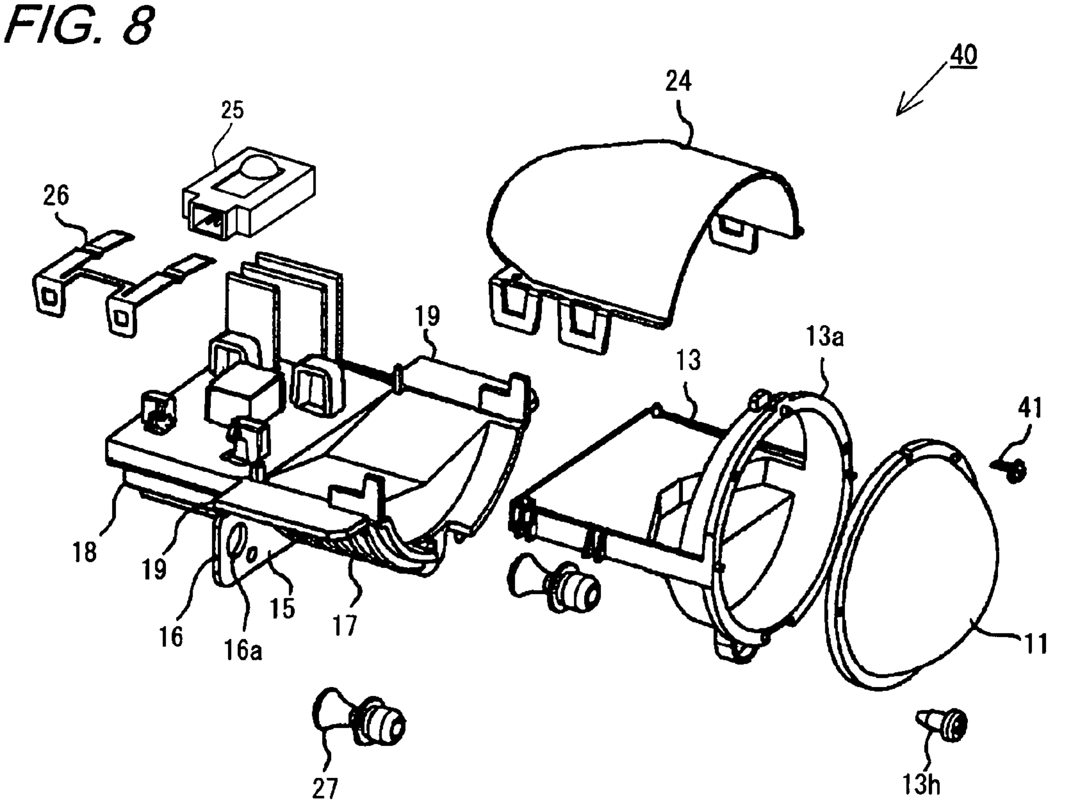
FIG. 8 is an exploded perspective view of a light source unit 40 which constitutes a second embodiment of the invention.

FIG. 8 is an exploded perspective view of a light source unit 40 of a second embodiment of the invention. The light source unit 40 differs from the light source unit 10 in that the lens holder 12 is omitted and a lens 11 is fixedly mounted directly on a lens mount portion 13*a* of a shade 13 by use of mounting screws 41.

In this light source unit 40, since the an outer circumference of the lens 11 is held by the lens mount portion 13*a* of the shade, the lens mount portion 13*a* constitutes the holding device, and an imaginary cylinder 28 would be defined by the lens mount portion 13*a*.

Figure 9:
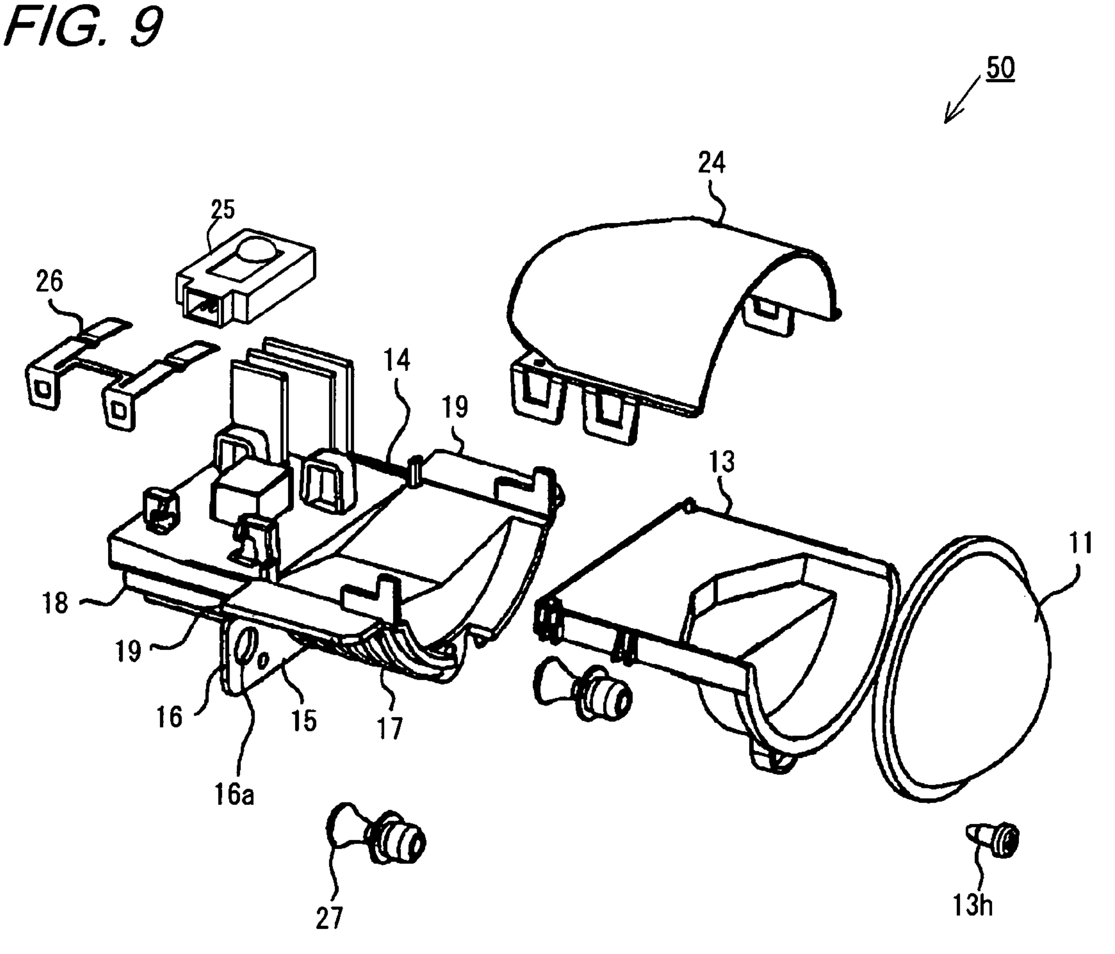
FIG. 9 is an exploded perspective view of a light source unit 50 which constitutes a third embodiment of the invention.

FIG. 9 is an exploded perspective view of a light source unit 50 of a third embodiment of the invention. The light source unit 50 differs from the light source unit 10 in that the lens holder 12 is omitted and a lens 11 is fixedly mounted by being held by a shade 13 and a reflector 24.

In the light source unit 50, since an outer circumference of the lens 11 is held by the shade 13 and the reflector 24, the shade 13 and the reflector 24 constitute the holding device, and an imaginary cylinder 28 would be defined by the shade 13 and the reflector 24.

In the embodiments that have been described heretofore, while the light source unit 10, 40, 50 is fixedly mounted in the mount portion 30 on the vehicle by use of the clips, a configuration may be adopted in which the clips 27 are replaced by male screws and female threads are cut in the through holes 34 in the mount portion 30 on the vehicle so that the male screws are screwed into the corresponding through holes 34. As this occurs, although the male screws constitute the engagement device, the engagement device is not limited to the clips 27 and the male screws. Any engagement device may be adopted to replace the existing holding or engagement device, provided that the engagement device enables the light source unit 10, 40, 50 to be mounted in the mount portion 30 on the vehicle by being brought into engagement with the engagement holes 16*a* in the mounting rib 16.

In the embodiments above, while the shade 13 and the heat block 14 are configured as the separate members, a configuration may be adopted in which the shade 13 and the heat block 14 are integrated into a single unit.

The numbers of and intervals at which the fins 17*a*, 18*a* are disposed may be altered as required.

The invention is not limited to the description of the embodiments in any way. Various modes are also incorporated in the invention which are modified variously without departing from the spirit and scope of the invention and which fall within a range that those skilled in the art to which the invention pertains can easily conceive and reach.

The present application is based on Japanese patent application No. 2009-284617, filed on Dec. 16, 2009, the entire contents of which are incorporated herein by reference.

What is claimed is:

1. A light source unit mounted in a mount portion of a vehicle, the light source unit comprising:

a heat block and a reflector accommodated in an imaginary cylinder that is defined by a holding device for holding an outer circumference of a lens, wherein a first heat dissipating portion and a second heat dissipating portion, which are partitioned by a partition plate, are provided on an outer circumferential surface of the heat block, wherein a plurality of fins are projected on the first heat dissipating portion which is disposed on a lens side of the heat block so as to extend in a circumferential direction, and a second plurality of fins are projected on the second heat dissipating portion so as to extend in an axial direction of the heat block, and wherein the partition plate comprises a mounting rib, and a mounting device is provided on the mounting rib for mounting the light source unit in the mount portion of the vehicle.

2. A light source unit as set forth in claim 1, wherein the mounting device comprises an engagement hole formed in the mounting rib, and wherein the mounting rib is mounted on the mount portion of the vehicle by an engagement device which is in engagement with the engagement hole.

3. A light source unit as set forth in claim 1, wherein the partition plate is formed substantially at a center of the heat block, and wherein the mounting rib projects from the heat block in a radial direction thereof.

4. A light source unit as set forth in claim 1, wherein a guide rib is formed on the heat block so as to extend in the axial direction thereof, and wherein the guide rib is brought into engagement with the mount portion of the vehicle.

* * * * *